W. H. DOBLE.
PACKAGE FILLING MACHINE.
APPLICATION FILED DEC. 27, 1909.

954,722.

Patented Apr. 12, 1910.

Witnesses:
R. Wallace,
John H. Parker.

Inventor
William H. Doble
by Macleod, Calver, Copeland & Dike
attorneys

W. H. DOBLE.
PACKAGE FILLING MACHINE.
APPLICATION FILED DEC. 27, 1909.

954,722.

Patented Apr. 12, 1910.
7 SHEETS—SHEET 3.

Witnesses:
R. Wallace.
John H. Parker.

Inventor:
William H. Doble
by Macleod, Calver, Copeland & Dike
attorneys

W. H. DOBLE.
PACKAGE FILLING MACHINE.
APPLICATION FILED DEC. 27, 1909.

954,722.

Patented Apr. 12, 1910.

Witnesses:
R. Wallace.
John H. Parker

Inventor
William H. Doble
by Macleod, Calver, Copeland & Dike
Attorneys

W. H. DOBLE.
PACKAGE FILLING MACHINE.
APPLICATION FILED DEC. 27, 1909.

954,722.

Patented Apr. 12, 1910.
7 SHEETS—SHEET 6.

Witnesses:
R. Wallace,
John H. Parker

Inventor:
William H. Doble
by Macleod, Calver, Copeland & Dike
attorneys

W. H. DOBLE.
PACKAGE FILLING MACHINE.
APPLICATION FILED DEC. 27, 1909.

954,722.

Patented Apr. 12, 1910.

Witnesses:
R. Wallace,
John H. Parker

Inventor:
William H. Doble
by Macleod, Calver, Copeland & Dike
attorneys

UNITED STATES PATENT OFFICE.

WILLIAM H. DOBLE, OF QUINCY, MASSACHUSETTS, ASSIGNOR TO PNEUMATIC SCALE CORPORATION LIMITED, OF QUINCY, MASSACHUSETTS, A CORPORATION OF MAINE.

PACKAGE-FILLING MACHINE.

954,722.

Specification of Letters Patent.   Patented Apr. 12, 1910.

Application filed December 27, 1909.   Serial No. 535,097.

*To all whom it may concern:*

Be it known that I, WILLIAM H. DOBLE, a citizen of the United States, residing at Quincy, in the county of Norfolk and State of Massachusetts, have invented a certain new and useful Improvement in Package-Filling Machines, of which the following is a specification, reference being had therein to the accompanying drawings.

In weighing certain classes of goods, particularly sticky goods such as raisins into packages, it is desirable to have a continuous uninterrupted stream because if the stream is broken off to shift the packages the material is more apt to clog up the passage from the weighing machine and form bunches which interfere with the flow of the material when the valve is opened to permit the flow to begin again. Moreover, there is economy of time in providing a continuous flow machine in which the flow is shifted from one package to another without interrupting the flow.

One object of the present invention is to provide a plurality of weighing scales each adapted to hold a package and means for supplying a continuous flow of material which shall be diverted alternately from one weighing machine to the other together with means for properly positioning packages upon each scale while the goods are feeding into the package upon the other scale so as to be ready to receive the flow when it is diverted from said other scale so that there shall be no less of material or interruption of flow.

Another object of the invention is to provide two primary feeds and two secondary feeds, one or the other of said primary feeds and one or the other of said secondary feeds being always open and one or the other of said primary feeds and of said secondary feeds being always closed, means for transferring the packages from each of the primary feeds to one or the other of the secondary feeds and means controlled by the weight of the package under either of the secondary feeds to cut off the feed to said package and remove the said package therefrom and to position another package under the said feed and to open the other secondary feed.

Another object of the invention is to provide two primary weighing scales and two secondary or drip stream weighing scales and means whereby there will be continuous feed to one or the other of the two primary weighing scales, one being closed when the other is open and a continuous feed to one or the other of the two secondary weighing scales, one being closed when the other is open and means controlled by the secondary weighing mechanism to position upon the secondary weighing mechanism the packages thus transferred from the primary mechanism.

Other features of the invention will be more particularly set forth hereinafter.

The invention will be fully understood from the following description taken in connection with the accompanying drawings, and the novel features are pointed out and clearly defined in the claims at the close of the specification.

In the drawings, In Figs. 1 and 2 the mechanism for transferring the packages from the belts leading from the drip-weighing machine to the intermediate belt which carries the cartons from the machine is omitted on account of insufficient space, but is shown in detail in Figs. 3 and 12.

In the preliminary weighing mechanism there are two weighing mechanisms and a central hopper with two chutes, one of which is adapted to supply material to a package on the scale of one machine, and the other of which is adapted to supply material to a package on the scale of the other machine, and a deflector mounted in the hopper above the branching of the chutes so that the stream may be alternately diverted from one chute to the other. The packages are moved to positions beneath the several chutes by an endless chain having package moving fingers spaced at intervals apart which engage the packages on a table and push them along on the table to positions respectively under the feed chutes. These endless chains move intermittently and are driven by means of bevel-gearing from a single intermittently moving driving-shaft, the bevel-gearing being so arranged that for each half revolution of the driving-shaft the carrier-chain for one weighing mechanism will be actuated by reason of its bevel-gear connection, while the companion carrier-chain and its bevel-gear remain stationary and during the remaining half revolution of the driving-shaft the first connection will remain stationary and the second one will move, thereby feeding the cartons alternately to the two weighing mechanisms. While a carton is being moved to position beneath one of the chutes, the carton which has been previously positioned beneath the other chute is being filled, and when the stream is diverted so that it is flowing into the carton, which, as stated, has been previously placed under the second chute, the filled carton from the first chute will be moved by its carrier away from the position beneath the chute and a fresh carton will be positioned in its place beneath the chute. The mechanism for bringing the cartons into position to be engaged by the said carrier-chains comprises a belt which is located between the said two tables and mechanism is provided by which, while one of the said carrier-chains is moving and the other carrier-chain is at rest, a carton will be transferred from said common feed-belt into position on the table adjacent to the carrier-chain which is at rest to be engaged by the finger on said last mentioned carrier-chain at the next period when said second carrier-chain starts to move. After the carton is filled, it is at the next movement of the carrier-chain, which brought it beneath the feed-chute, transferred by one of the fingers of the carrier-chain from the table on which the carton stands beneath the feed-chute to a continuously driving belt which is close to the table, and that continuously moving belt carries the carton containing the preliminary load into a position adjacent to the drip-stream weighing mechanism where it is engaged by transferring mechanism similar to the transferring mechanism which moved the carton from the common feed-belt to the table connected with the preliminary weighing mechanism and is thereby transferred to a table into position to be engaged by an intermittently driven carrier-chain with fingers similar to the one previously described for the preliminary weighing mechanism and is thereby transferred to a position beneath one of the chutes of the drip-stream weighing mechanism. There are two carrier-chains for the drip-stream weighing mechanism and two scales, and these carrier-chains are actuated to move intermittently and alternately as were the carrier-chains for the preliminary weighing mechanisms.

Referring now to the drawings,—1 represents the hopper of the preliminary weighing mechanism and 201 represents the hopper of the drip-weighing mechanism. The description of the hoppers and the feed-chutes of the two weighing mechanisms are in many respects alike. The hopper 1 is provided with two branch chutes 2, 3, leading therefrom.

Mounted on a rockershaft 4 is a deflector plate 5 which is adapted to alternately close the passages from the hopper to the feed chutes and when one is closed, the other is open. The said rockershaft 4 is actuated to move the deflector by means of a lever 6 which is actuated alternately by the two slide rods 7, 8, which are in turn actuated by mechanism controlled by the tipping of the scale as will be more particularly described hereinafter.

Beneath each feed-chute 2, 3, is a weighing scale 42 upon the platform of which the cartons rest while receiving their load. The cartons are fed into the machine on a continually running belt 10 and at a certain point are transferred from the belt 10 alternately to positions on one of the two tables 11, one on either side of the belt 10, whence they are moved by the carrier-chains 12, 13, to positions under their respective feed-chutes. Each carrier-chain is provided with carton-moving fingers 14 spaced at regular intervals apart to engage the cartons and push them along on the table 11. The chain 12 passes around a sprocket wheel 15 on the upright shaft 16 and around the sprocket wheel 17 on the shaft 18. The shaft 16 is driven by means of a bevel gear 19 mounted fast thereon which engages with an intermittent bevel gear 20 mounted on the driving shaft 21. The teeth on the bevel gear 20 extend only one-half the circumference of the said bevel gear, the bevel gear 20 being twice the circumference of the bevel gear 19, so that there will be as many teeth on one-half the circumference of the gear 20 as there are on the entire circumference of the gear 19, and during the one-half of the rotation of the driving shaft, in which the teeth of the gear 20 engage with the teeth of the gear 19, the bevel gear 19 and its shaft 16 will be given one complete rotation. During the remaining one-half of the rotation of the bevel gear 20 the bevel gear 19 will not be actuated, because of the plain surface of the other half of the gear 20. The chain 13 runs over a sprocket wheel 22 mounted on an upright shaft similar to shaft 16, and also around a sprocket 23, mounted on an upright shaft 24. The sprocket chain 13 is given an intermittent movement, similar to the intermittent movement of the sprocket chain 12 but alternately therewith by means of intermittent bevel gear 25 mounted on the shaft which carries the sprocket wheel 22, and intermittent bevel gear 26 mounted on the driving shaft 21, the teeth on the bevel gear 26 being so arranged that they will begin to engage with the teeth of the bevel gear 25 when the smooth part on the bevel gear 20 reaches the bevel gear 19. The driving shaft 21 is stopped at each one-half revolution by the tripping of clutch mechanism which will be hereinafter described, the clutch being reset by the tipping of one of the scales as will be hereinafter more particularly described.

The mechanism for shifting one of the cartons from the feed belt 10 to the position on the table where it will be engaged by the carrier-chain 12 or 13, as the case may be, is so controlled that the shifting will take place during the period of rest of the carrier-chain to which the carton is carried by the shifter. The shifting mechanism will now be described:—Fulcrumed on a stud 27 is a lever 28 which extends horizontally above the belt 10 over the top of the cartons. The forward end of said lever is formed with an elongated slot 29 with which there engages a stud 30 which carries on its lower end a plate 31 which, when the lever 28 oscillates, is moved transversely of the path of the cartons on the belt so as to push one of the cartons, which may be in position on the belt to be so engaged, either to the right to move it into position on the table to be engaged by one of the fingers on the carrier-chain 12, or to the left into position to be engaged by one of the fingers on the carrier-chain 13. The said stud 30 moves in a guide slot 32 in a stationary plate 33. The stud 30 passes down through the slotted lever 28 and the fixed rail 34 and is supported by a shoulder 36 which bears upon a block 37 set into the rail 34 and through which the stud passes.

Mounted on the driving shaft 21 is a cam 38 which engages the opposite end of the lever 28 from that which engages the stud 30. The inclined face of the cam 38 is so formed that during one-half of the rotation of the driving shaft and cam, the lever 28 will be turned from the position shown in Fig. 2, until the stud 30 is moved to the opposite end of the slot 32 and at the next half of the revolution of the shaft, the oppositely inclined face of the cam will permit the lever to be turned back again by means of the spring 39.

Figure 7:
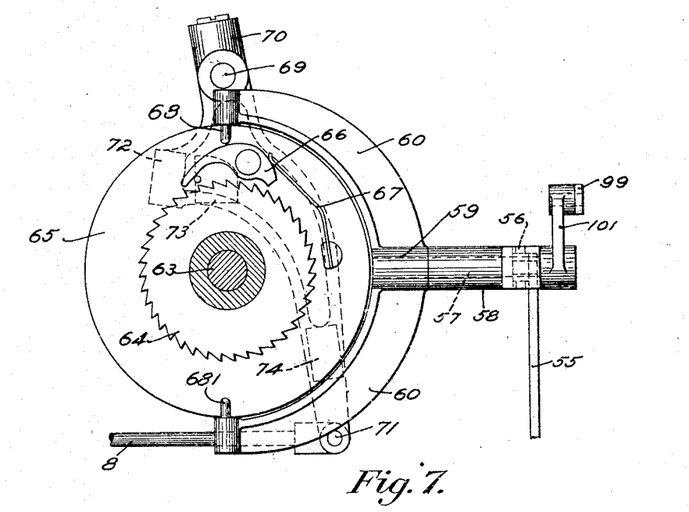
Fig. 7 is a detail showing the clutch mechanism which controls the shifting of the deflector from one feed chute of the hopper to the other feed chute.

As previously stated, the cartons are fed into position to be engaged by the shifting plate 31. In order to prevent the cartons from being carried by the feed-belt 10 to a point beyond the proper position for being thus engaged, a stop-plate 40 is provided, which is hung from the rail 34, so as to hang down above the belt 10 transversely of the path of the carton. When one carton is removed from the belt by the shifting plate 31, this will give room for the next carton behind it to be moved up into position against the stop-plate 40, ready to be engaged by the shifting plate on its return movement to move the carton in the opposite direction from that of the one just removed and carry it into position to be engaged by one of the feed fingers on the other carrier-chain. After a carton has been moved by the shifting plate into position to be engaged by one of the fingers 14 on one of the carrier-chains, the carton will at a subsequent period of movement of the carrier-chain be moved into position beneath one of the chutes 2 or 3. For instance, with the machine in the position shown in Fig. 2, a carton would be already in position to be engaged by the finger 14 on the chain 13 and another carton would be in position on the belt 10 ready to be moved by the shifter plate into position to be engaged by a finger on the chain 12. Also a carton is supposed to be under the chute 2 just being filled. While the carton under the chute 2 is being filled, the carrier-chain 13 will move, carrying an empty carton forward under the chute 3 and at the same time while that is being done, the shifter plate will move a carton from the belt 10 into position to be engaged by the carrier-chain 12. When the carton being filled under the chute 2 is filled sufficiently for the scale to tip, the deflector plate 5 will be turned by mechanism controlled by the tipping of the scale to divert the stream through the feed chute 3 to the carton which has been placed beneath it. The carrier-chain 13 now being at rest, the carrier-chain 12 will be actuated to move through one of its periods of movement which will carry the carton with its preliminary load from beneath the chute 2 forward onto the continuously traveling belt 41 which in the manner to be hereinafter described will carry the carton with its preliminary load forward to the drip-feed. The mechanism for shifting the deflector plate 5 and for controlling the movement of the driving shaft through the tipping of the scale will now be described. See Figs. 7 and 11.

Figure 11:
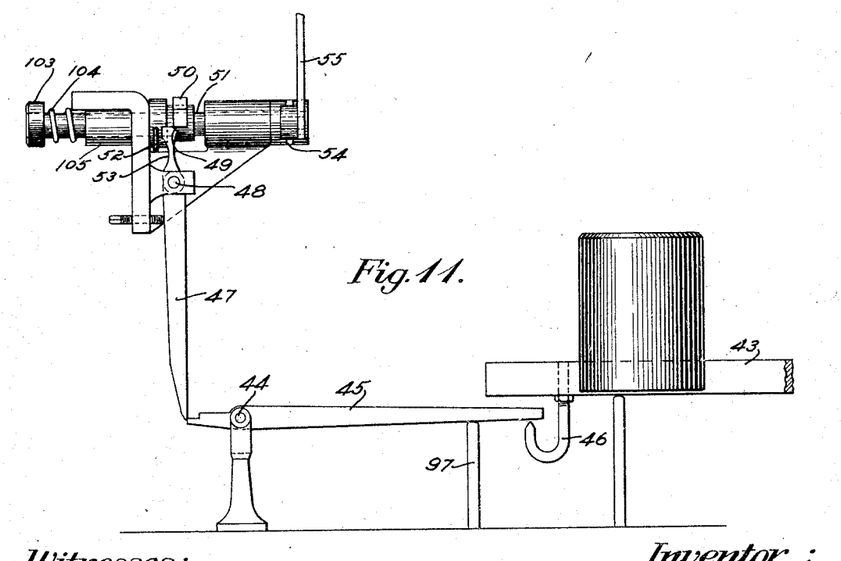
Fig. 11 is an elevation showing in detail the mechanism which is actuated by the tipping of the scale to start the driving mechanism when the scale is tipped by the predetermined weight in the package.

When the scale 42 descends under the weight of the package, the scale beam 43 connected therewith will be turned on its fulcrum and the forward end, that is, the end opposite the end which carries the scale pan it tipped upward. Fulcrumed at 44 is a horizontal tripping lever 45, the long arm of which is adapted to be engaged by a hook 46 hung from the scale beam when the scale tips under the weight of a load. The short arm of the tripping lever 45 is adapted to engage the lower end of the vertical tripping lever 47, fulcrumed at 48. The upper end of said tripping lever 47 has a beveled face 49, which, when the lower end of the lever 47 is engaged by the end of the horizontal tripping lever 45, is adapted to be engaged by a finger 50 projecting from a rockershaft 51, so that when the rockershaft 51 turns in the direction to cause the finger 50 to ride down on the beveled face 49 of the lever 47, it will tend to turn the lever 47 on its fulcrum, swinging the lower end of the lever 47 to the right when viewed in the position shown in Fig. 11, provided the tripping lever 45 is disengaged therefrom, but lever 47 is prevented from so turning as long as the ends of the two levers are engaged with each other. When the rocker shaft 51 is rocked in the reverse direction, as by spring 104, that is, to carry the finger 50 back into the position shown in Fig. 11, the lower end of lever 47 will tend to swing back by gravity into its vertical position and will also be facilitated by a pin 52 which will engage the curved face 53 of the upper arm of the lever 47. Mounted fast on the rockershaft 51 is a lever 54 which is connected by a connecting rod 55 with the lever 56, said lever 56 being fast to a rockershaft 57 mounted in a bearing 58 which is fast to the frame. See Fig. 7. Fast on the rockershaft 57 is a hub 59 from which project two curved arms 60 which we term the yoke which together half encircle the pawl-carrier 65. At each rocking movement of the shaft 51, the shaft 57 is also rocked through the connecting mechanism, and will also rock the attached yoke arms 60. The means for rocking the shaft 51 will be hereinafter described.

A pulley 61 is mounted fast on shaft 63. Mounted fast on the pulley 61 is a ratchet 64. Mounted loose on the shaft 63 is a pawl-carrier 65, carrying a pawl 66, which is adapted to engage with the ratchet 64 and when so engaged, the ratchet and the pawl-carrier will move together. A spring 67 normally tends to keep the pawl 66 in engagement with the ratchet. Projecting from the two opposite ends of the arms 60 are pins 68 and 681 which are adapted to engage and trip the pawl 66 from the ratchet. One of the said pins is always in the path of the pawl and one of them is outside of the path. When the yoke is rocked, it turns so that the pin then in the path will be moved out of the path and the other will be moved into the path, so that the pawl will be tripped twice at each rotation of the pawl-carrier.

Fulcrumed at 69 is a bent lever 70 of irregular shape whose lower arm is pivoted at 71 to the connecting rod 8. Projecting from the lever 70 are two blocks 72, 74, on opposite sides of the fulcrum 69 which are adapted alternately to engage with a block 73 which is fast to the pawl-carrier 65. At each revolution of the pawl-carrier 65, the block 73 on the pawl-carrier engages the block 72 on the lever 70 and turns the lever 70 on its fulcrum, causing the connecting rod 8 to reciprocate toward the left, as viewed in Fig. 7, thereby actuating the lever 6 which controls the movement of the deflector plate 5, turning the deflector plate so as to close the chute 2 and open the chute 3. The blocks 72 and 74 are so located that the pawl will engage one or the other at each half revolution so that at the end of the next half revolution of the pawl-carrier 65, after passing the block 72, the pawl will engage the block 74, throwing the lever in the reverse direction, thereby moving the connecting rod 8 in the reverse direction and withdrawing the connecting rod from engagement with the lever 6. The lever 6 will now be reversed to move the deflector plate 5 to close the other chute until it is actuated by the connecting rod 7 through the tipping of the other scale and similar companion intermediate mechanism, including a ratchet and pawl-carrier similar to the ones just described. It is not deemed necessary to show and describe in detail the said companion mechanism. So far as shown, the similar parts are given the same numerals.

Figure 8:
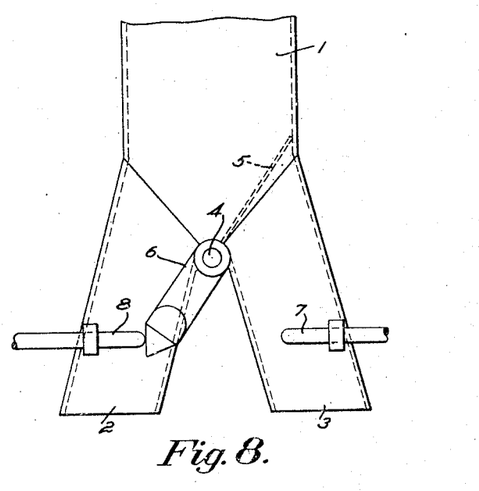
Fig. 8 is a front elevation of one of the hoppers and branch feed chutes and deflector.
Figure 9:
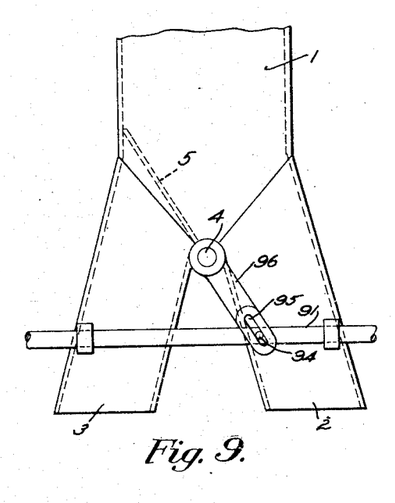
Fig. 9 is a rear elevation of the parts shown in Fig. 8.
Figure 10:
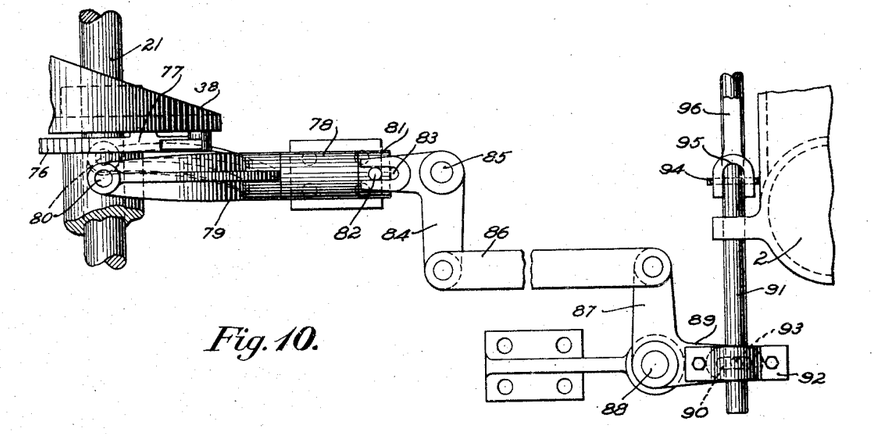
Fig. 10 is a detail plan of the mechanism for controlling the intermittent movement of the main driving shaft.

The mechanism for controlling the movement of the shaft 21 will now be described. See particularly Fig. 10. Loose on the shaft 21 is a pulley 75 on the hub of which is a ratchet 76 which is adapted to be engaged by a pawl 77, pivoted to the face of the cam 38 which is fast on the driving shaft 21. The pulley 75 is continuously driven. When the pawl 77 is engaged with the ratchet, the shaft 21 will be driven. Mounted on a shaft which rocks in bearings 78 is a yoke 79 having two arms similar to the yoke arms 60 previously described, said arms carrying the two pawl-stops 80 which are adapted to alternately engage and trip the pawl 77. The yoke 79 is rocked by the shaft on which it is mounted to alternately bring one of the stops 80 into position to engage the pawl 77. On the opposite end of the shaft, which carries the yoke 79, from the yoke is a lever 81 which carries a pin 82 which engages with a slot 83 in one arm of bell-crank 84 fulcrumed at 85. The other arm of the lever 84 is pivoted to one end of the connecting rod 86, the other end of said connecting rod being pivoted to a bell-crank 87 fulcrumed at 88. The arm 89 of the bell-crank 87 is formed with an elongated slot 90. A rod 91 has clamped thereon the plates 92 from one of which projects a pin 93 which engages with said slot 90 in the bell-crank lever arms 89 so that as the rod 91 reciprocates longitudinally, it will rock the said bell-crank. Said rod 91 carries a pin 94 which engages with a slot 95 in a lever 96 fast on the opposite end of shaft 4 from that which carries the lever 6. See Figs. 8 and 9. When the lever 6 is moved by the rod 8 so as to rock the shaft 4, it will thereby move the rod 91, causing the bell-crank 89 to rock and through the intermediate mechanism already described, it will oscillate the yoke 79 in one direction, and when said lever 6 is moved in the reverse direction by the rod 7, the rod 91 will be moved in the reverse direction and through the intermediate mechanism will oscillate the yoke 79 in the reverse direction.

Figure 1:
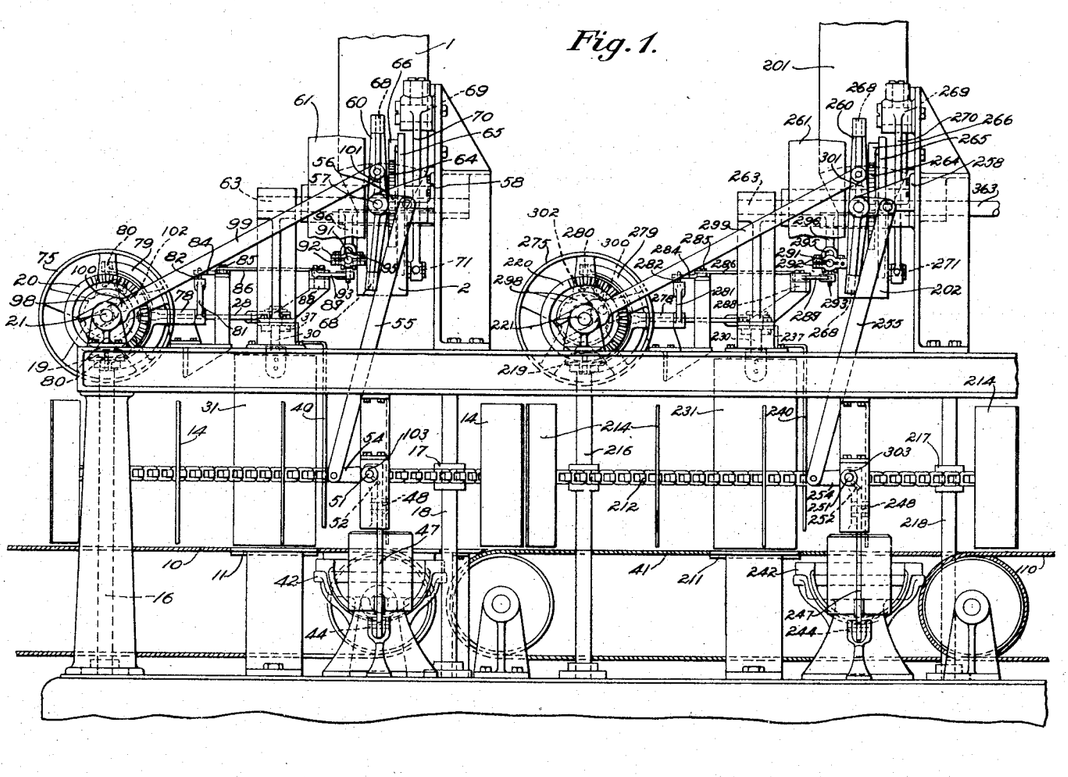
—Figure 1 is a side elevation of a machine embodying the invention including one pair of weighing scales, each adapted to give a preliminary load to the package and another pair of weighing scales together with apparatus for furnishing a small or drip-stream to a package on each scale and means for positioning the cartons and transferring them from one scale to another.

The mechanism for resetting the tripping levers 45 and 47 will now be described. See Figs. 1, 2 and 11. The rotation of the rockershaft 51 in a direction to throw the vertical tripping lever 47 in one direction is controlled by the tipping of the scale which releases the horizontal tripping lever 45 from the lower end of the vertical lever 47 as already described. After the scale pan resumes its normal position by the removal of the load, so that the scale beam 43 returns to the position shown in Fig. 11, the long arm of the tripping lever 45 being heavier than the short arm will fall until it strikes the post 97, thus bringing the short arm up into position to be reëngaged by the vertical tripping lever 47. The mechanism for rotating the shaft 57 in the reverse direction to reset the vertical tripping lever 47 is controlled by a cam 98 on the shaft 21, as will now be described. See Figs. 1, 2 and 7.

One end of a connecting rod 99 is forked to straddle the shaft 21 and is provided with a roll 100 to engage with a cam path in the face of the cam 98. The other end of said connecting rod 99 is pivoted to one end of a lever 101, the other end of said lever being fast to rockershaft 57. The cam 98 is so constructed as to actuate the connecting rod 99 to rock the shaft 57 in the reverse direction from that which was given in tripping the lever 47, at some time during the half revolution of the shaft 21 which moves the chain-carrier to transfer the filled package from beneath the chute 2 to the belt 41 and to bring an empty carton beneath the chute 2. The cam 98 is cut away at 102, so that after the cam roll 100 passes off of the end of the cam path, the connecting rod 99 is free to move backward, and it will move backward when the shaft 51 turns. Mounted on the shaft 51 is a collar 103 to which is made fast one end of a spring 104 coiled around the shaft 51, the other end of the spring 104 being fast to the bearing 105. When the shaft 51 is turned by the cam 98, the spring 104 is put under tension and as soon as the cam roll 100 has ridden off of the end 102 of the cam path, the spring 104 has a tendency to turn the shaft 51 in the reverse direction, but this is resisted by the lower end of the vertical tripping lever 47 being engaged by the rear end of the tripping lever 45. As soon as the scale tips, the tripping lever 45 is tipped and thereby is disengaged from the vertical lever 47, and the shaft 51 is free to respond to the action of the spring 104, as previously described.

At the same time that the shaft 51 is rocked by means of the intermediate mechanism actuated by the cam 98, the shaft 57 will also be rocked by means of the lever 101, actuated by said cam 98, in a direction to rock the yoke 60 and carry the pin 68 to one side out of engagement with the pawl 66, so that the pawl 66 will be caused by its spring 67 to engage with the ratchet 64 and thereby lock together the shaft 63 and the pulley 61, as previously described, so that shaft 63 will revolve a half revolution until the pawl is again tripped by the stop 68¹, and during this half revolution the rod 8 will be moved back from the deflector lever 6 into position to be moved forward again at the next half revolution of the shaft 63.

On the other end of the shaft 21 from that which carries the cam 98 is a cam 108 for actuating mechanism connected with the companion weighing mechanism and feeding mechanism, which belong with chute 3. (See Fig. 2.) The same numbers will be given to corresponding parts as were given to the mechanism connected with the chute 2 so far as convenient for the purpose of avoiding unnecessary description, detail description of the same being unnecessary. The cams 108 and 98 are so adjusted with relation to each other that the cam 108 will actuate its connecting rod 99 during the other half revolution of the shaft 21 from that during which the cam 98 actuates its connecting rod. All of the parts connected with the mechanism which belong with the feed chute 3 are so adjusted as to work alternately with the mechanism connected with the chute 2.

The packages after leaving the scale beneath the chute 2 are delivered onto the continuously traveling belt 41, as previously mentioned, and the packages on the scale beneath the chute 3 are delivered onto a corresponding continuously traveling belt 410. The packages on the belt 41 are transferred to a table 211 along which they are pushed by the fingers 214 on carrier-chain 212 to position on a weighing scale beneath the drip-chute 202 and the packages on the belt 410 are transferred to the table where they are carried by the carrier-chain 213 to a position on a weighing scale beneath the chute 203. After they pass from the scales under the feed-chutes 202 and 203 respectively, they are transferred to the common belt 109 which receives them from both weighing mechanisms.

The mechanism for actuating the carrier-chains 212, 213, and the construction of the transfer mechanism which carries the packages respectively from the belts 41 and 410 to the table 211 and also the construction and mode of operation of the deflector in the hopper 201 are substantially like the mechanism for doing similar work connected with the primary weighing mechanism except, however, the feed-chutes 202 and 203 are spread at a greater angle than the feed chutes 2 and 3, because the scale pans of the weighing mechanisms are more widely separated from each other and for the same reason the transfer mechanism is proportioned somewhat differently.

Parts connected with the secondary weighing mechanism which correspond, except with change in proportions, to parts connected with the primary weighing mechanism, numbered from 1 to 108 are numbered from 201 to 308, that is, in the parts connected with secondary weighing mechanism, the first figure of the numeral 2 or 3, as the case may be, is intended as a prefix figure, and it is deemed unnecessary to go into a detail description.

In the transfer mechanism on account of the packages being on two belts 41 and 42 spaced apart from each other, instead of being received from a single belt 10, as in the primary weighing mechanism, the shifter plate 231 is formed with two side wings, one of which engages the packages which are to be transferred from belt 41, the other of which engages the packages which are to be transferred from the belt 410, so as to avoid the long stroke which would be necessary, if it were made with only one wing, like that shown in the shifting plate 31. By reason of the two wings 231, two studs 230, one for each wing of the shifter plate, are provided and the slot 232 in the plate 233 is made longer to accommodate the two studs.

The mechanism for transferring the packages from beneath the feed chutes 202 and 203 respectively to the belt 109 will now be described. The packages beneath the feed chute 202 are at the next movement of the carrier-chain 212, after the scale has tipped under the weight of the feed-chute 202, moved forward by one of the fingers on the carrier-chain to a belt 110 and the packages on a scale beneath the feed-chute 203 are in a similar manner, after the scale is tipped, carried by the chain 213 to the belt 111. The transfer from the belts 110 and 111 respectively to the belt 109 takes place at a point beyond the end of the belts 41 and 410.

Figure 3:
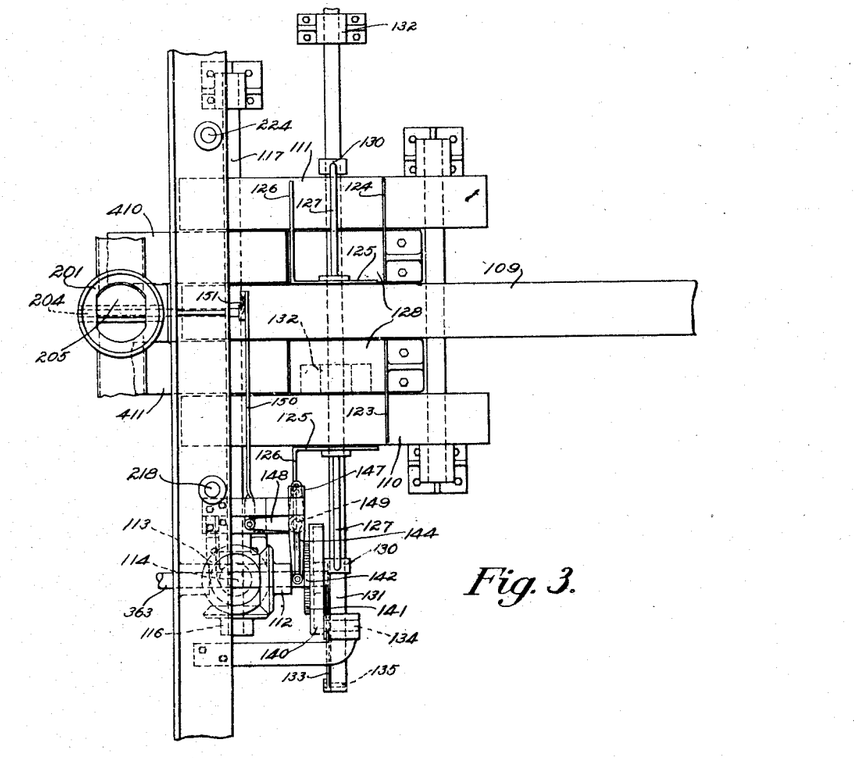
Fig. 3 is a plan of the intermediate belt and transfer mechanism which was omitted from Fig. 2.
Figure 4:
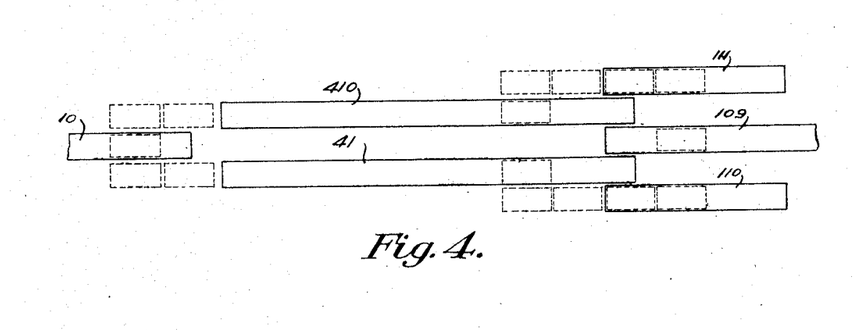
Fig. 4 is a diagram showing the arrangement of the carrier belts and the different positions that the cartons take in going through the mechanism.
Figure 5:
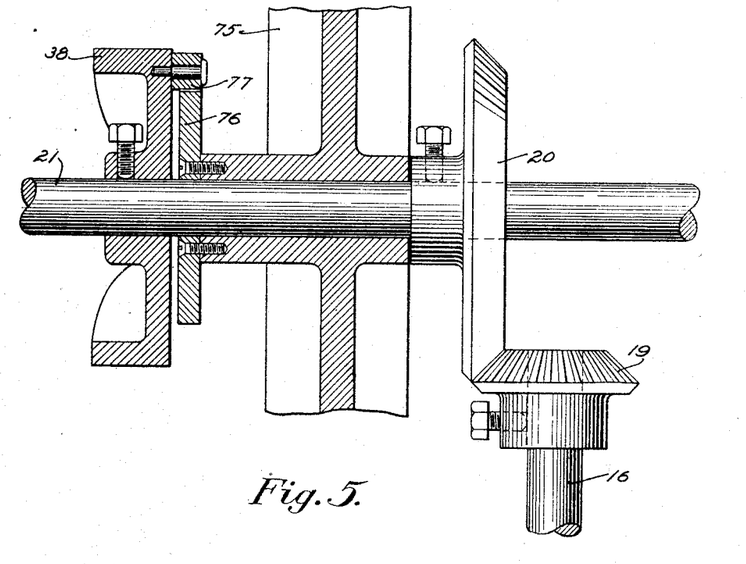
Fig. 5 is an enlarged detail, partly in section, showing the driving shaft and the connections for giving intermittent movement to one of the carrier chains.
Figure 6:
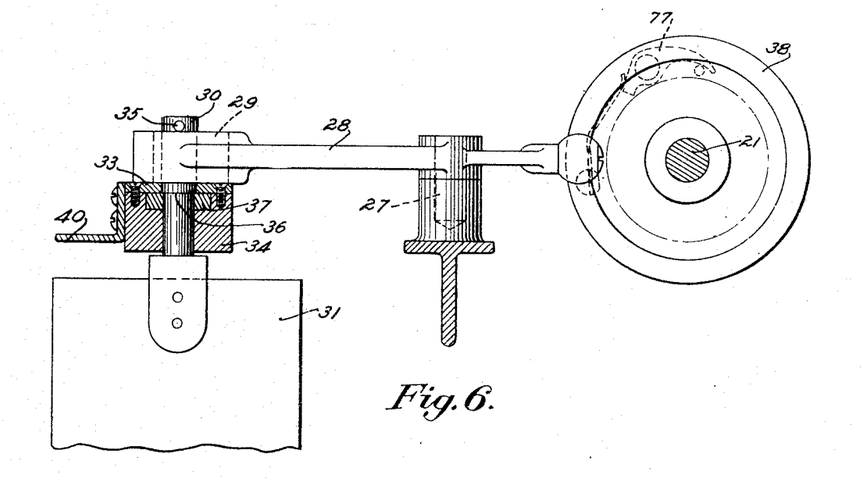
Fig. 6 is an enlarged elevation, partly in section, through the driving shaft, and viewed from the left of Fig. 5, showing the mechanism for transferring the packages from the common feed belt connected with the preliminary weighing mechanism to a position for the package to be engaged by the carrier chain.
Figure 12:
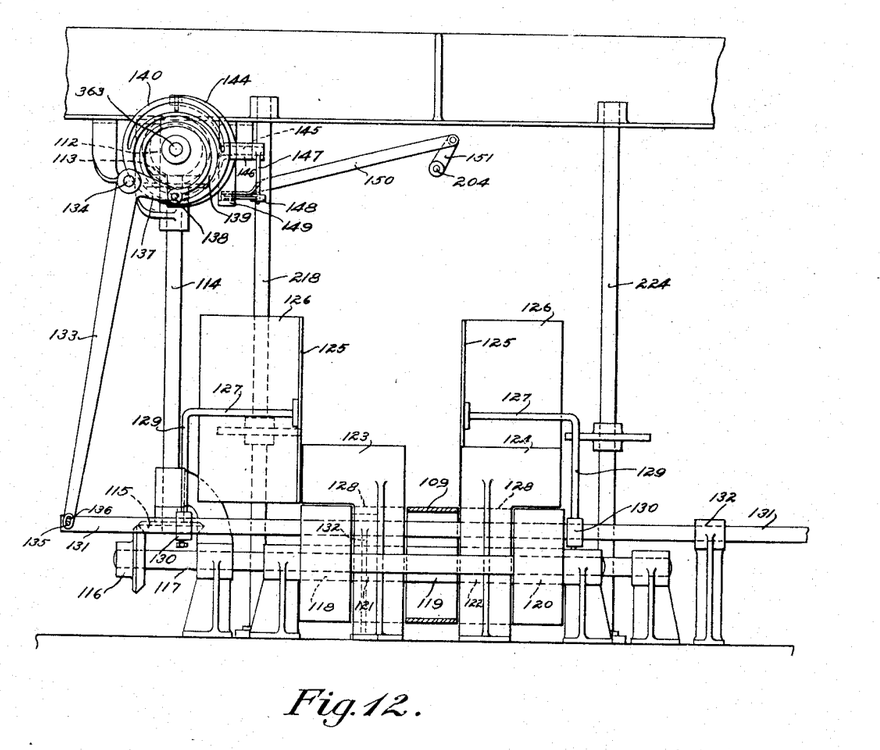
Fig. 12 is an elevation of the parts shown in Fig. 3, viewed from the right of Fig. 3.

Referring now to Figs. 3 and 12. The belts 110 and 111, as well as the belts 109, 410 and 41, are all continuously driven by shaft 363 and intermediate mechanism as follows:—Mounted on shaft 363 is a bevel gear 112 which engages with a bevel gear 113 on vertical shaft 114. The lower end of vertical shaft 114 is a bevel gear 115 which engages with a bevel gear 116 on a horizontal shaft 117. On shaft 117 are the pulleys 118, 119 and 120, which respectively drive the belts 110, 109 and 111. Belts 41 and 410 are respectively driven by pulleys 121 and 122, both mounted on shaft 117. Extending transversely of the belt 110 is a stationary stop bar 123 which stops the packages on the belt 110 to prevent them from passing beyond the point for engagement of the transfer mechanism and a similar stop-bar 124 is located transversely of the belt 111. A right angled vertical push plate, having one arm 125 extending longitudinally of the belt 110, and an arm 126 at right angles thereto, is attached to a reciprocating rod 127, said rod 127 being reciprocated by suitable mechanism whereby at intervals as frequently as a package is transferred from beneath the feed-chute 202, said reciprocating rod 127 will move the push plate 125 to shove a package from the belt 110 across the table 128 onto the intermediate belt 109. The reciprocating rod 127 is actuated by mechanism controlled by the shifting of the deflector plate 205 in the hopper 201 and hence controlled by the tipping of the scales beneath the two feed chutes 202 and 203. The tipping of the scale beneath the chute 202 causes the reciprocating rod 127 to move in one direction and the tipping of the scale beneath the chute 203 causes the reciprocating rod 127 to move in the reverse direction. The means whereby the reciprocating rod 127 is thus actuated is as follows: The rod 127 has a downwardly bent arm 129, the lower end of which is made fast to a collar 130, which collar is fast on a horizontal rod 131 which is slidable in bearings 132. Pivotally connected with one end of the rod 131 is a bell crank lever 133 which is fulcrumed at 134. The lower end of the bell crank lever 133 is pivotally connected with the said rod 131 by a pin 135 engaging with an elongated slot 136. The short arm 137 of the bell crank lever 133 is provided with a cam roll 138 which engages with a cam path 139 in the cam 140. Said cam 140 is mounted loosely on shaft 363. The rod will be given a reciprocating movement in each direction at each complete rotation of the cam 140, but cam 140 is rotated only when it is connected by a clutch mechanism with the shaft 363, as will be described. Mounted fast on the shaft 363 is a ratchet 141. Pivoted to the cam 140 is a pawl 142 which is adapted to engage with the ratchet 141, and when so engaged the cam 140 will revolve with the shaft 363. An arc-shaped yoke 144, mounted on a rocker-stud 145 in bearings 146, is provided at each of its ends with stop-pins similar to the stop-pins 68 and 681 on the yoke 60 to alternately trip the pawl at each half-revolution of the cam. It is not deemed necessary to show the said yoke and mechanism for tripping the pawl in detail because it is similar to that shown in Fig. 7, except that the pawl is carried directly on the cam 140 instead of on a separate pawl-carrier. Fast to the shaft 146 is a downwardly hanging lever 147 which passes through a slot in a bell-crank lever 148 fulcrumed at 149. Pivotally connected with the other arm of the bell-crank 148 from that through which the lever 147 passes is a rod 150 whose opposite end is pivotally connected with a lever 151. Said lever 151 is fast to the shaft 204 on which is mounted the deflector plate 205. Said shaft 204 is actuated in a similar manner to shaft 4 which carries the deflector plate 5 previously described. At each rocking movement of the shaft 204 to throw the deflector plate 205, the connecting rod 150 will be moved and thereby turn the bell-crank lever 148 and rock the yoke 144 to trip one of the stop-pins carried thereby from the pawl which engages the ratchet 141 and at the same time the other stop-pin will be brought into position to engage the pawl and trip it from the ratchet as soon as the cam has completed a half revolution.

The arm 126 of the push plate is of sufficient length so that when the push arm 125 moves in a direction to push the package from the belt 110 to the belt 109, said arm 126 will extend transversely above the belt 110 so as to hold back any other packages on the belt 110 and prevent them from coming forward until the reciprocating rod 123 has moved back to bring the push arm 125 back again to the outer side of the belt 110; otherwise a package would be carried forward on the belt 110 into a position to interfere with the return movement of the push plate.

The mechanism for transferring the packages from the belt 111 to the belt 109 is exactly the same as described for moving them from the belt 110 to the belt 109 and corresponding parts, therefore, on the drawings are given the same numerals.

Figure 2:
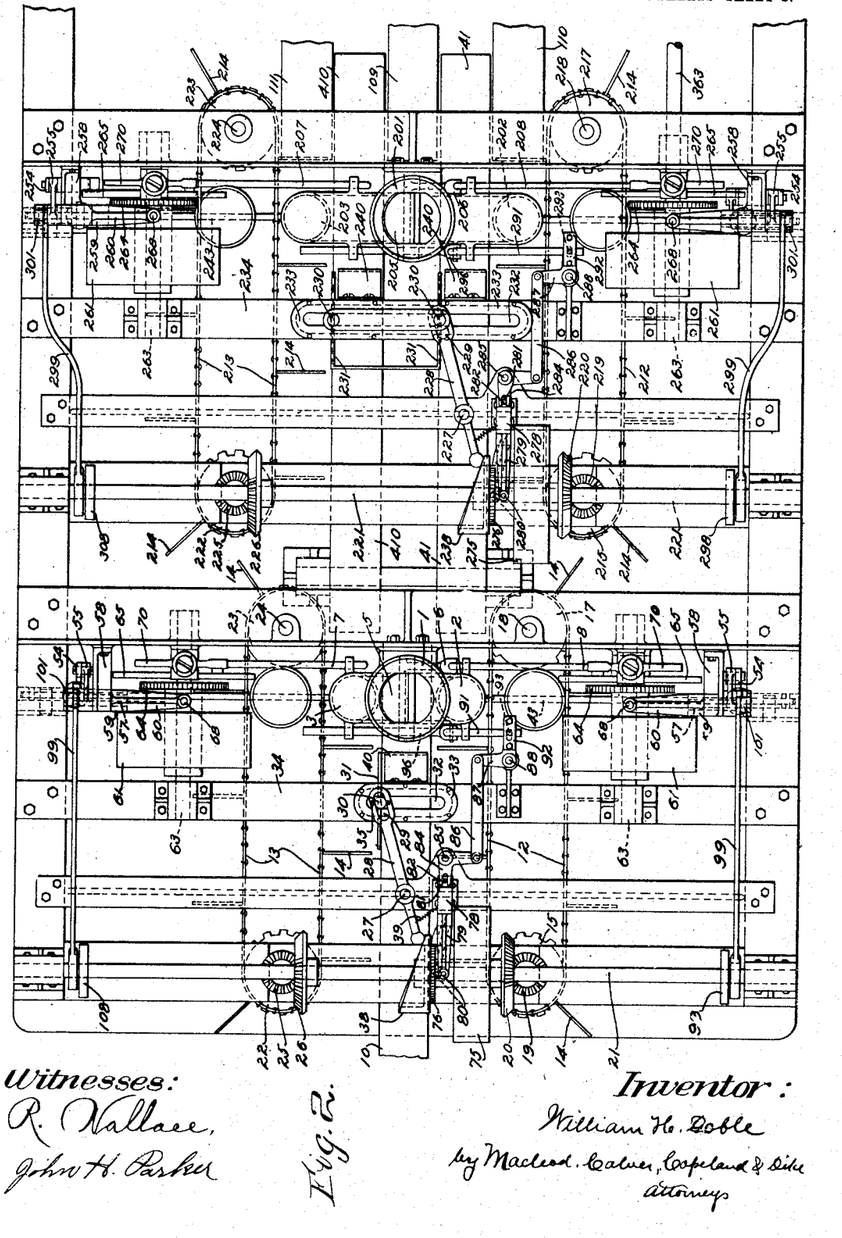
Fig. 2 is a plan of the parts shown in Fig. 1.

In brief, the operation of the machine is as follows: The empty cartons are fed to the machine on the belt 10 and are alternately transferred by the transfer plate 31 to position to be engaged respectively by the carrier-chains 12 and 13 and thereby moved respectively beneath the feed chutes 2 and 3. While a package is on the scale beneath the feed chute 2, the carrier-chain 12 is at rest, and the carrier-chain 13 is moving, so as to move from beneath the chute 3 the package which has just received its load and bring an empty carton into position beneath the feed chute 3 ready to be filled when the deflector plate shifts. At this same time, the carrier-chain 13 moves a partially filled package onto the belt 410. As soon as the package under the feed chute 2 has received sufficient load for it to tip the scale, the deflector plate 5 will be shifted to close the passage through the feed chute 2 and open the passage through the feed chute 3; the carrier-chain 12 will be started and move until the shaft 21 has turned through a half revolution, thereby removing the partly filled package from beneath the feed chute 2 onto the belt 41 and bringing a fresh package underneath the feed chute 2 and, while the carrier-chain 12 is moving, the shifting plate 31 will be moved from the right hand end of the slot 32 to the left hand end of the slot, as shown in Fig. 2, to push an empty package from the belt 10 into position to be engaged by the carrier-chain 13; that is, the shifter plate moves away from the carrier-chain that is in motion.

The timing of operation of the drip or secondary weighing mechanism is independent of the timing of the preliminary weighing mechanism. The partially filled package on the belts 41 and 410 respectively are carried forward on said belts into position where the double shifter plate 231 alternately moves a package from the belt 41 into position to be engaged by the carrier-chain 212 and to move a package from the belt 410 into position to be engaged by the carrier-chain 213. The carrier-chain 212 moves during one-half of the rotation of the shaft 221 and the carrier-chain 213 moves during the remaining half of the rotation of the shaft 221. While the carrier-chain 212 is at rest, a package is being filled beneath the chute 202; the carrier-chain 213 transfers the previously filled package from beneath the chute 203 onto the belt 111 and brings another package beneath the chute 203 and a package which has been previously filled from the chute 203 is transferred from the belt 111 onto the belt 109 at the same time the shifter plate 231 will have moved a package from the belt 41 into position to be engaged by the carrier-chain 212 at the next movement of the carrier-chain 212. Now, when the scale beneath the chute 202 tips, the chain 212 will be started; the deflector plate 205 will be turned to close the passage through the chute 202 and open the passage through the chute 203; a filled package will be removed from beneath the chute 202 by the carrier-chain 212; another package will be brought beneath the chute 202; the shifter plate 231 will be moved to transfer a package from the belt 410 into position to be engaged by the chain 213 at the next movement of the chain 213, and one of the filled packages will be moved by the push plate 125 from the belt 110 onto the belt 109. The filled packages, as they are transferred to the belt 109, will be carried away and may be removed from the belt 109 in any way desired.

What I claim is:—

1. In a package filling machine, two primary feed mechanisms, two secondary feed mechanisms, means for alternately supplying material to packages placed beneath said primary feed, means whereby said primary feeds are alternately opened and closed in such manner that there is a continuous feed from one or the other and when one is open the other is closed, means whereby said secondary feeds are alternately opened and closed in such manner that there is a continuous feed from one or the other and when one is open the other is closed, means for transferring packages from said primary feed to positions adjacent the said secondary feed, mechanism controlled by the weight of a package beneath either one of the secondary feeds whereby the feed to the package being filled is cut off and the package is removed and another is positioned and the other secondary feed is opened.

2. In a package filling machine, two primary weighing scales, two secondary weighing scales, means for supplying material alternately to packages on the primary weighing scales, means for supplying material alternately to packages on the secondary weighing scales, means controlled by the tipping of either primary scale whereby the supply is cut off from one primary scale and opened to the other, means controlled by the tipping of either secondary scale whereby the supply is cut off from one and opened to the other, means controlled by the tipping of either primary scale to transfer the package which is on the primary scale which is tipped away from the scale and to a position adjacent to the secondary weighing mechanism and means controlled by the tipping of either of the scales connected with the secondary weighing mechanism whereby one of said packages transferred from the primary weighing mechanism is positioned upon one of the scales of the secondary weighing mechanism.

3. In a package filling machine, a reservoir having two feed chutes leading therefrom, a movable cut-off which is adapted to close the passage from the reservoir to either one of said feed chutes so that when one is open the other will be closed, a weighing scale beneath each of said feed chutes, means for positioning packages alternately on said scales, means controlled by the tipping of either scale to move the cut-off so as to close the passage to the filled package and divert the flow to the other chute.

4. In a package filling machine, a reservoir having two feed chutes leading therefrom, a movable cut-off which is adapted to close the passage from the reservoir to either one of said feed chutes so that when one is open the other will be closed, a weighing scale beneath each of said feed chutes, means for positioning packages alternately on said scales, means controlled by the tipping of either scale to move the cut-off so as to close the passage to the filled package and divert the flow to the other chute and means also controlled by the tipping of the scale whereby the package on the scale that is tipped is removed therefrom and a fresh package is brought to the scale.

5. In a package filling machine, a reservoir having two feed chutes leading therefrom, a movable cut-off which is adapted to close the passage from the reservoir to either one of said feed chutes so that when one is open the other will be closed, a weighing scale beneath each of said feed chutes, two intermittently moving package movers, one of which is adapted to move a package to a position on one of the scales and the other of which is adapted to move a package to the other scale, and driving mechanism whereby said package movers are actuated alternately and intermittently.

6. In a package filling machine, a reservoir having two feed chutes leading therefrom, a movable cut-off which is adapted to close the passage from the reservoir to either one of said feed chutes so that when one is open the other will be closed, a weighing scale beneath each of said feed chutes, two intermittently moving package movers, one of which is adapted to move a package to a position on one of the scales and the other of which is adapted to move a package to the other scale, driving mechanism whereby said package movers are actuated alternately and intermittently, said driving mechanism being controlled by the tipping of either of the two scales.

7. In a package filling machine, a reservoir having two feed chutes leading therefrom, a movable cut-off which is adapted to close the passage from the reservoir to either one of said feed chutes so that when one is open the other will be closed, a weighing scale beneath each of said feed chutes, two intermittently moving package movers, one of which is adapted to move a package to a position on one of the scales and the other of which is adapted to move a package to the other scale, driving mechanism whereby said package movers are actuated alternately and intermittently, a support for the packages before they are brought within range of said package movers, a movable shifting device and means for actuating said shifting device whereby packages are alternately transferred from said support into positions to be engaged by said package movers.

8. In a package filling machine, a reservoir having two feed chutes leading therefrom, a movable cut-off which is adapted to close the passage from the reservoir to either one of said feed chutes so that when one is open the other will be closed, a weighing scale beneath each of said feed chutes, two intermittently moving package movers, one of which is adapted to move a package to a position on one of the scales and the other of which is adapted to move a package to the other scale, driving mechanism whereby said package movers are actuated alternately and intermittently, a support for the packages before they are brought within range of said package movers, a movable shifting device and means for actuating said shifting device whereby packages are alternately transferred from said support into positions to be engaged by said package movers, said shifting mechanism being controlled by the tipping of the scale.

9. In a package filling machine, a supply reservoir, two feed chutes leading therefrom in different directions, a movable deflector which is adapted to close either one of said chutes and open the other so that when one is open the other is closed, a scale beneath each of said chutes, two package movers, one of which is adapted to move packages to one of the scales and the other of which is adapted to move packages to the other of said scales, an intermittently rotating shaft and mechanism connected therewith whereby said package movers are actuated, said intermediate connections being so constructed that one of said package movers will be actuated during one half rotation of said shaft and then stopped during the second half of the rotation, and the other package mover will be actuated during the second half rotation of the shaft and then stopped during the next half rotation of the shaft.

10. In a package filling machine, a supply reservoir, two feed chutes leading therefrom in different directions, a movable deflector which is adapted to close either one of said chutes and open the other so that when one is open the other is closed, a scale beneath each of said chutes, two package movers, one of which is adapted to move packages to one of the scales and the other of which is adapted to move packages to the other of said scales, an intermittently rotating shaft, mechanism connected therewith whereby said package movers are actuated, said intermediate connections being so constructed that one of said package movers will be actuated during one half rotation of said shaft and then stopped during the second half of the rotation and the other package mover will be actuated during the second half rotation of the shaft and then stopped during the next half rotation of the shaft, means for stopping the rotation of the shaft at the end of each half rotation, and means controlled by the tipping of either scale to again start the rotation of the shaft.

11. In a package filling machine, two primary weighing scales, two secondary weighing scales, a supply reservoir for each pair of weighing scales, each reservoir having two feed chutes one of which is adapted to supply material to a package on one of the scales with which it is connected and the other of which is adapted to supply material to a package on the other scale with which it is connected, a movable deflector in each reservoir which is adapted to close each one of the feed chutes connected therewith in such manner that when one is closed, the other is open, means controlled by the tipping of either scale whereby the deflector of the reservoir with which it is connected is moved to close the passage through the feed chute to the package on the scale which is tipped and open the passage through the chute to the package on the companion scale, means controlled by the tipping of either primary scale to transfer the package which is on the scale which is tipped away from the scale and to a position adjacent to the secondary weighing mechanism and means controlled by the tipping of either of the scales connected with the secondary weighing mechanism whereby one of said packages transferred from the primary weighing mechanism is positioned upon one of the scales of the secondary weighing mechanism.

12. In a package filling machine, two primary weighing scales, two secondary weighing scales, a supply reservoir for each pair of weighing scales, each reservoir having two feed chutes, one of which is adapted to supply material to a package on one of the scales with which it is connected and the other of which is adapted to supply material to a package on the other scale with which it is connected, a movable deflector in each reservoir which is adapted to close each one of the feed chutes connected therewith in such manner that when one is closed the other is open, means controlled by the tipping of either scale whereby the deflector of the reservoir with which it is connected is moved to close the passage through the feed chute to the package on the scale which is tipped and open the passage through the chute to the package on the companion scale, means controlled by the tipping of either primary scale to transfer the package on the scale which is tipped away from the scale and to a position adjacent to the secondary weighing mechanism, means controlled by the tipping of either of the scales connected with the secondary weighing mechanism whereby one of said packages thus transferred from the primary weighing mechanism is positioned upon one of the scales of the secondary weighing mechanism, means controlled by the tipping of either scale of the secondary weighing mechanism whereby the package upon the scale which is tipped is transferred therefrom, two traveling belts to which the packages from said secondary scales are respectively transferred, a traveling belt intermediate said two traveling belts and mechanism controlled by the tipping of either of said secondary scales whereby one of the packages on the belt to which the package was transferred from the secondary scale is transferred to said intermediate belt.

13. In a package filling machine, a supply reservoir, two branch feed chutes leading therefrom on opposite sides, a movable deflector which is adapted to close the passage through either one of said chutes, one passage being open when the other is closed, a weighing scale under each of said feed chutes, two intermittently moving carriers having receptacle moving fingers, one of which is adapted to move receptacles to one of the scales and the other of which is adapted to move receptacles to the other scale, a continuously traveling belt on which receptacles are brought to a position between said two intermittently moving carriers, a rotary driving shaft, mechanism connecting each of said intermittently moving carriers with said driving shaft, whereby during one half of each rotation of said driving shaft one of the intermittent carriers will be moved and stopped at the end of the half rotation, the other carrier being moved during the remaining half of each rotation of the driving shaft and then brought to a rest, means actuated by the tipping of either scale whereby the driving mechanism will be started in operation to move the carrier connected with said scale, a transversely reciprocable receptacle mover which is adapted to move packages from said feed belt into positions to be engaged by one or the other of said intermittent receptacle movers alternately with each other and means whereby the tipping of the scales alternately controls the alternate movements of said reciprocable receptacle mover.

14. In a package filling machine, a supply reservoir, two branch feed chutes leading therefrom on opposite sides, a movable deflector which is adapted to close the passage through either one of said chutes, one passage being always open when the other is closed, a weighing scale under each of said feed chutes, two intermittently moving carriers having receptacle moving fingers, one of which is adapted to move receptacles to one of the scales and the other of which is adapted to move receptacles to the other scale, a continuously traveling belt on which receptacles are brought to a position between said two intermittently moving carriers, a rotary driving shaft, mechanism connecting each of said intermittently moving carriers with said driving shaft, whereby during one half of each rotation of said driving shaft one of the intermittent carriers will be moved and stopped at the end of the half rotation, the other carrier being moved during the remaining half of each rotation of the driving shaft and then brought to a rest, means actuated by the tipping of either scale whereby the driving mechanism will be started in operation to move the carrier connected with said scale, a transversely reciprocable receptacle mover which is adapted to move packages from said feed belt into positions to be engaged by one or the other of said intermittent receptacle movers alternately with each other, and means whereby the tipping of the scales alternately controls the alternate movements of said reciprocable receptacle mover, two traveling belts onto which respectively the packages on the said two scales are moved by said intermittent receptacle movers, a second reservoir having two feed chutes connected therewith whose discharge ends are spaced apart from each other wider than the space between the feed chutes of the first supply reservoir, a scale beneath each of said second pair of feed chutes, two intermittently moving carriers, one on the outer side of each of said carrier belts, a reciprocable receptacle mover which is adapted to move packages on said belts alternately from one of said belts into position to be engaged by one of said intermittent carriers and from the other belt into position to be engaged by the other of said carriers, means controlled by the tipping of either scale underneath said second pair of feed chutes to actuate said reciprocable receptacle mover and means controlled by the tipping of each of said scales to actuate the package moving carrier connected with that particular scale.

15. In a package filling machine, a supply reservoir, two branch feed chutes leading therefrom on opposite sides, a movable deflector which is adapted to close the passage through either one of said chutes, one passage being open when the other is closed, a weighing scale under each of said feed chutes, two intermittently moving carriers having receptacle moving fingers, one of which is adapted to move receptacles to one of the scales and the other of which is adapted to move receptacles to the other scale, a traveling carrier by which receptacles are brought to a position between said two intermittently moving carriers, a rotary driving shaft, mechanism connecting each of said intermittently moving carriers with said driving shaft, whereby during one half of each rotation of said driving shaft one of the intermittent carriers will be moved and stopped at the end of the half rotation, the other carrier being moved during the remaining half of each rotation of the driving shaft and then brought to a rest, means actuated by the tipping of either scale whereby the driving mechanism will be started in operation to move the carrier connected with said scale, and a reciprocable carrier which is adapted to move packages from said intermediate carrier into positions to be engaged by one or the other of said intermittent receptacle movers alternately with each other.

16. In a package filling machine, a supply reservoir, two branch feed chutes leading therefrom, a movable deflector which is adapted to close the passage through either one of said chutes, one passage being open when the other is closed, a weighing scale under each of said feed chutes, two intermittently moving receptacle movers, one of which is adapted to move receptacles to one of the scales and the other of which is adapted to move receptacles to the other scale, a carrier which brings receptacles to a position between said two intermittent receptacle movers, means actuated by the tipping of either scale whereby the receptacle mover connected therewith will move a receptacle onto said scale, a reciprocable carrier which is adapted to move receptacles from said intermediate carrier alternately into positions to be engaged by one or the other of said intermittent receptacle movers.

17. In a package filling machine, two primary weighing scales, two secondary weighing scales, means for supplying material alternately to each one of each pair of weighing scales and to simultaneously supply material to one scale of each pair, means controlled by the tipping of either one of the scales to shut off the supply to the scale which is tipped and open the supply to the companion scale, means controlled by the tipping of either scale to remove the receptacle which is on the scale which is tipped and to move another receptacle onto the scale which has tipped, and carrier mechanism between the primary and secondary weighing mechanism to which the receptacles are transferred from the scale of the primary weighing mechanism by the carrier which removes receptacles from the scales and means controlled by the tipping of either scale of the secondary weighing mechanism to transfer a package from said intermediate receptacle carrier to a position to be engaged by one of the carriers which moves packages to the secondary weighing mechanism.

18. In a package filling machine, two feed chutes, a weighing scale beneath each feed chute, two package movers, one of which is adapted to move packages to one of the scales and the other of which is adapted to move packages to the other scale, mechanism for moving packages into a position between said two package movers and a reciprocable package mover which is adapted to receive the packages from said intermediate package mover and transfer them alternately to positions to be engaged by said two first mentioned package movers.

19. In a package filling machine, two feed chutes, a weighing scale beneath each feed chute, two package movers, one of which is adapted to move packages to one of the scales and the other of which is adapted to move packages to the other scale, driving mechanism which actuates each of said package movers through a predetermined limited range of movement and then stops, mechanism for moving packages into a position between said two package movers, mechanism controlled by the tipping of either scale to start in operation the package mover which leads to the scale which is tipped, a reciprocable package mover which, when it moves in one direction, moves a package from said intermediate package mover to a position to be engaged by one of the package movers which leads to the scale and when it moves in the reverse direction it moves a package into position to be engaged by the package mover which leads to the other scale, said reciprocable package mover being controlled by the tipping of either scale.

20. In a package filling machine, two feed chutes, two package carriers, one of which is adapted to move packages to a position beneath one of said feed chutes and the other of which is adapted to move packages beneath the other of said feed chutes, a rotary driving shaft, intermediate driving mechanism connecting each of said package carriers with said driving shaft so constructed that during one period of movement of the driving shaft one of the carriers will be moved and then stopped and during a fol- 21. In a package filling machine, two feed chutes, two package carriers, one of which is adapted to move packages to a position beneath one of said feed chutes and the other of which is adapted to move packages beneath the other of said feed chutes, a rotary driving shaft, intermediate driving mechanism connecting each of said package carriers with said driving shaft so constructed that during one period of movement of the driving shaft one of the carriers will be moved and then stopped and during a following period of movement of the driving shaft, the other carrier will be moved and then stopped, a carrier adapted to bring packages into a position between said two intermittent carriers, a transversely reciprocable shifter which, as it moves in one direction, is adapted to bring one of the packages from said intermediate carrier into a position to be engaged by one of said intermittent carriers and when it moves in the reverse direction it moves a package into a position to be engaged by the other intermittent package carrier.

22. In a package filling machine, two feed chutes, two package carriers, one of which is adapted to move packages to a position beneath one of said feed chutes and the other of which is adapted to move packages beneath the other of said feed chutes, a rotary driving shaft, intermediate driving mechanism connecting each of said package carriers with said driving shaft so constructed that during one period of movement of the driving shaft one of the carriers will be moved and then stopped and during a following period of movement of the driving shaft, the other carrier will be moved and then stopped, a carrier adapted to bring packages into a position between said two intermittent carriers, a transversely reciprocable shifter which, as it moves in one direction, is adapted to bring one of the packages from said intermediate carrier into a position to be engaged by one of said intermittent carriers and when it moves in the reverse direction it moves a package into a position to be engaged by the other intermittent package carrier, a lever connected with said shifting device and a cam mounted on said driving shaft which engages said lever and actuates it to reciprocate said shifting device.

In testimony whereof I affix my signature, in presence of two witnesses.

WILLIAM H. DOBLE.

Witnesses:
   WILLIAM A. COPELAND,
   ALICE H. MORRISON.